Dec. 9, 1969  SEIUEMON INABA ET AL  3,482,357
AUTOMATICALLY CONTROLLED CAM GRINDING SYSTEM
Filed Oct. 27, 1965  2 Sheets-Sheet 1
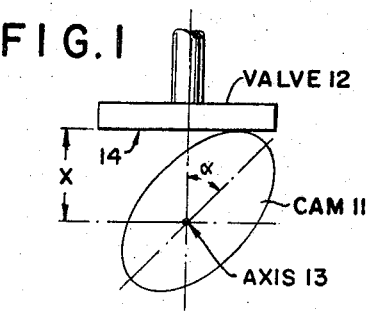
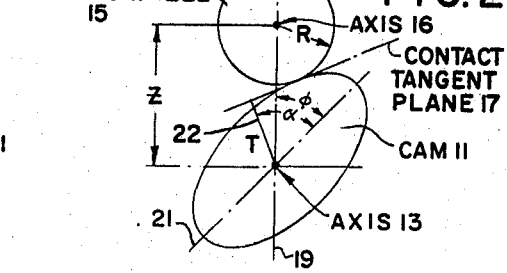
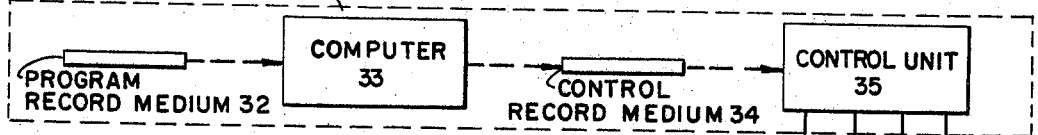
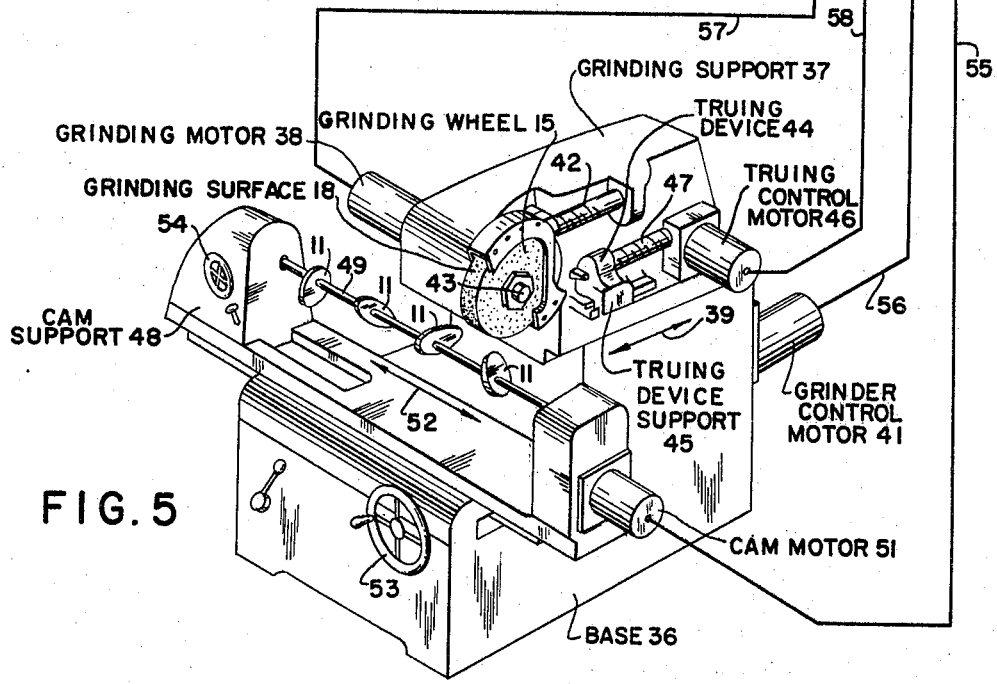

United States Patent Office 3,482,357
Patented Dec. 9, 1969

3,482,357
AUTOMATICALLY CONTROLLED CAM
GRINDING SYSTEM
Seiuemon Inaba, Kawasaki-shi, and Yasumasa Ishihara, Nagoya-shi, Japan, assignors to Fujitsu Limited, Kawasaki, Japan, and Toyota Motor Co. Ltd., Toyoda-shi, Aichi-ken, Japan, both corporations of Japan
Filed Oct. 27, 1965, Ser. No. 505,347
Int. Cl. B24b 5/00, 17/00
U.S. Cl. 51—105                                             9 Claims

ABSTRACT OF THE DISCLOSURE

A cam which is adapted to be rotated about its axis through an angle to lift a valve a distance above the axis of the cam is supported for rotation about its axis and for linear movement. A grinding wheel is supported for rotation about its axis and for linear movement. The linear movement of the grinding wheel and the rotation of the shaft are in accordance with the relation $$Z = \sqrt{(X+R)^2 + \left(\frac{dX}{d\alpha}\right)^2}$$

and the relation $$\phi = \alpha + \tan^{-1}\left(\frac{\frac{dX}{d\alpha}}{R+X}\right)$$

wherein Z is the distance between the axis of the grinding wheel and the axis of the cam, $\phi$ is the angle of rotation of the cam relative to a line through the axes, $\alpha$ is the angle of rotation of the cam relative to a valve lifted thereby, X is the distance above the axis of the cam, a valve is lifted relative to the angle $\alpha$ and R is the radius of the grinding wheel.

---

The present invention relates to an automatically controlled cam grinding system. More particularly, the invention relates to a program controlled automatic cam grinding system.

The intake and exhaust cams of an internal combustion engine are copied by a master cam. The production of the master cam is time consuming, and thus inconvenient and expensive. Furthermore, the radius and grinding surface of the grinding wheel in the cam grinding operation vary due to abrasion of such grinding surface on the cam. This causes errors in the shape, outline and configuration of the cam. The cam is thus produced without precision and the grinding wheel must often be replaced, so that the cam production entails considerable expense.

The principal object of the present invention is to provide a new and improved automatically controlled cam grinding system.

An object of the present invention is to provide an automatically controlled cam grinding system which produces cams with great precision and at low cost.

In accordance with the present invention, an automatically controlled cam grinding system comprises a grinding wheel having an axis and a grinding surface. A grinder support supports the grinding wheel for rotation about its axis and for linear movement. A cam having an axis and a surface to be ground is supported for rotation about its axis and for linear movement by a cam support. An operation control provides control signals including first control signals corresponding to the actual angle of rotation of the cam and second control signals corresponding to the distance between the axis of the grinding wheel and the axis of the cam in accordance with a predetermined program of operations. A cam control connected to the operation control and coupled to the cam support rotates the cam in accordance with the first control signals from the operation control. A grinder control connected to the operation control and coupled to the grinder support rotates the grinding wheel about its axis and moves the grinder support and the grinding wheel supported thereby linearly relative to the cam in accordance with the second control signals from the operation control so that the cam is shifted in angle of rotation to incrementally present to the grinding surface of the grinding wheel the cam surface to be ground and the grinding wheel is shifted linearly relative to the cam to maintain constant contact between the grinding surface and the surface to be ground. A truing support supports a truing device for truing the grinding surface of the grinding wheel for linear movement. A truing control connected to the operation control and coupled to the truing support moves the truing support and the truing device supported thereby linearly relative to the grinding surface of the grinding wheel in accordance with control signals from the operation control whereby the truing device abuts the grinding surface to true the grinding surface after each grinding operation.

In order that the present invention may be readily carried into effect, it will now be described with reference to the accompanying drawings, wherein:

FIG. 1 is a schematic diagram of a cam in operation with a valve;

FIG. 2 is a schematic diagram of a cam in operative contact with a grinding wheel in a grinding operation;

FIG. 3 is a graphical presentation of the relative motion of the cam and grinding wheel of FIG. 2;

FIG. 5 is a perspective view of apparatus including the automatically controlled cam grinding system of the present invention.

Figure 4:
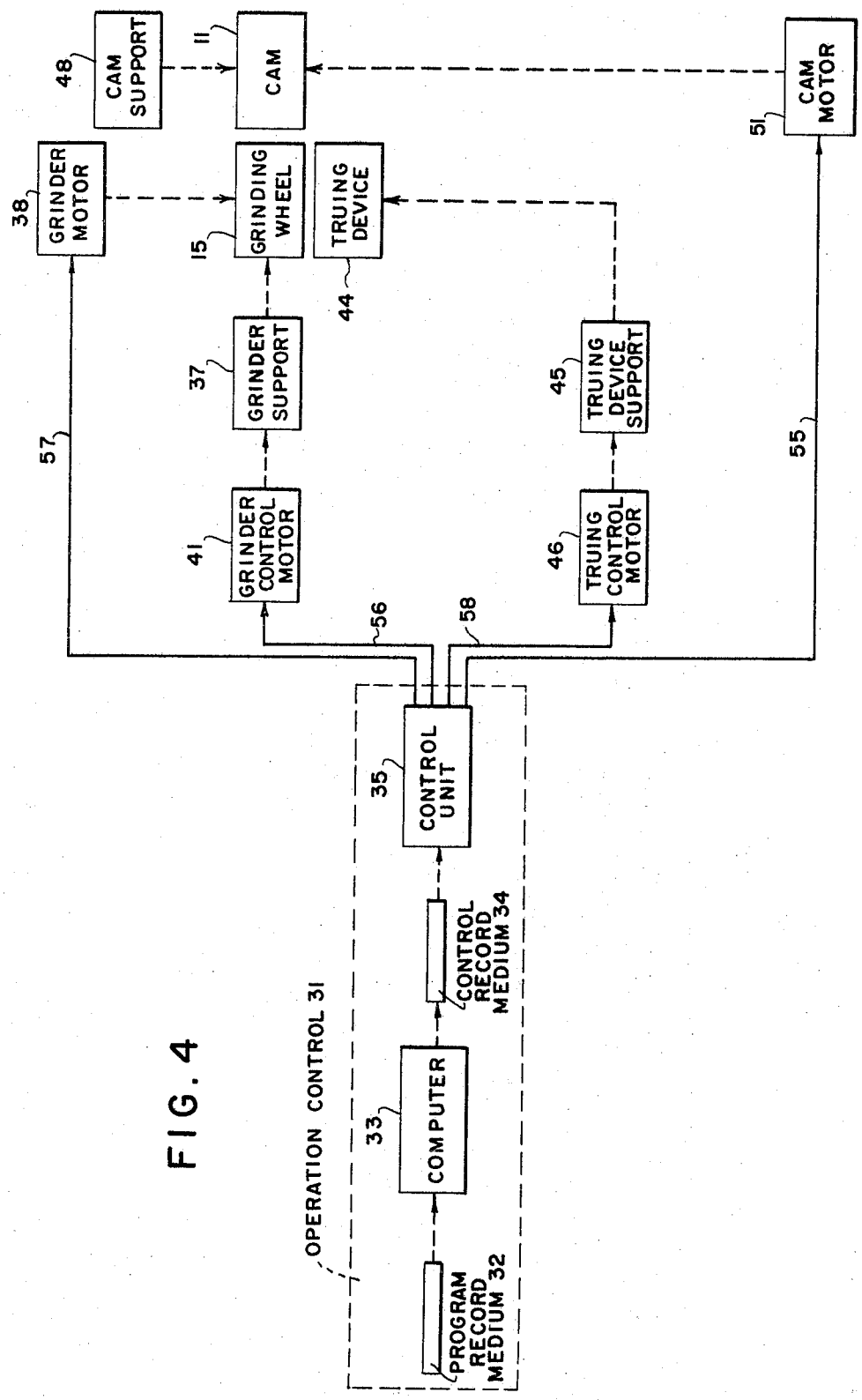
FIG. 4 is a schematic block diagram of an embodiment of the automatically controlled cam grinding system of the present invention.

In FIG. 1, a cam 11 is shown operating a valve 12. The cam 11 is rotated about its axis 13 by any suitable means (not shown) so that it abuts the valve 12 at a surface 14 thereof and lifts said valve a distance X from the axis 13. The relation of the distance X to which the valve is lifted and the angle of rotation $\alpha$ of the cam 11 is (1)                $X = X(\alpha)$ This relation is utilized in the design of the cam.

If the valve 12 is replaced by a grinding wheel 15, as shown in FIG. 2, the grinding wheel is rotated about its axis 16 by any suitable means (not shown) and abuts the cam 11 at a contact tangent line in a contact tangent plane 17. The grinding wheel 15 has a radius R and has a grinding surface 18. The grinding surface 18 of the grinding wheel 15 is the lateral cylindrical surface of the cylindrically-shaped grinding wheel; the planar end surfaces of said grinding wheel being the bases of the cylinder.

The axis 16 of the grinding wheel 15, and thus the grinding wheel, is movable along the line 19 through the axes 13 and 16 so that the cam 11 may remain in abutment with the grinding surface 18 of said grinding wheel while said cam rotates about its axis 13. The cam 11 rotates through a contact angle of rotation $\alpha$, which is the angle between the major cross section center plane 21 of said cam and a plane 22 perpendicular to the contact tangent plane 17 and passing through the axis 13 in said major cross section center plane and having a length T between said axis and said contact tangent plane. The distance Z is the distance between the axis 13 of the cam 11 and the axis 16 of the grinding wheel 15. The cam 11 moves through an actual angle of rotation $\phi$, which is the angle between the major cross section center plane 21 and the line 19.

The relation of the distance Z between the axes 13 and 16 and the contact and actual angles of rotation $\alpha$ and $\phi$ is (2) $$Z=\sqrt{(X+R)^2+(X')^2}$$

(3) $$\phi=\alpha+\tan^{-1}\left(\frac{X'}{R+X}\right)$$

where $X'$ equals $dX/d\alpha$.

The Equations 2 and 3 provide several magnitudes of $\phi$ and Z and thus enable a predetermination of the necessary variation of the distance Z by movement of the grinding wheel 15 with the axis 16 along the line 19 in accordance with the actual rotation of the cam 11 during the grinding operation. The magnitudes of the actual angle of rotation $\phi$ and the distance Z are illustrated graphically in FIG. 3. In FIG. 3, the abscissa represents the actual angle of rotation $\phi$ of the cam 11 in degrees and the ordinate represents the distance Z between the axes 13 and 16 in mm. The curve of FIG. 3 is formed of the plurality of determined magnitudes of $\phi$ and Z and may be utilized as the bases for the control of the cam grinding operation.

The curve of FIG. 3 of the relation between $\phi$ and Z may thus be utilized to control a two dimension machine control system in which one shaft is continuously rotated and is moved in linear directions in accordance with the ordinate of said curve at given instants and another shaft is rotated through an angle in accordance with the abscissa of the said curve at the corresponding instants. If the grinding wheel 15 is affixed to the one shaft which is continuously rotated and is moved in accordance with the ordinate of the curve of FIG. 3 and the cam 11 is affixed to the other shaft which is rotated through an angle in accordance with the abscissa of said curve, then said cam is automatically ground by said grinding wheel.

If the grinding surface 18 of the grinding wheel 15 is worn by abrasion with the cam so that the radius R of the grinding wheel is decreased by an amount D, the grinding wheel may be moved toward the cam so that the axis 16 of said grinding wheel is closer to the axis 13 of said cam by the amount D. The new magnitude of Z is then Z—D. The error E of the grinding of the cam at such time, converted into vertical motion T of FIG. 2, is $$E\simeq\frac{D}{2}\left[\frac{X'}{X+R}\right]^2$$

wherein $X'$ has a maximum magnitude of 10 mm., X equals 20 mm., R equals 300 mm., D equals 10 mm. and E has a maximum magnitude of 4.9 microns. The automatically controlled cam grinding system of the present invention may thus be used in practice with facility and precision and at low cost.

If a plurality of tapes are perforated or magnetically recorded or the like with data of the actual angle of rotation $\phi$ and the distance Z, each tape corresponding to 10 mm. of the grinding wheel radius R, so that each successive 10 mm. of the radius R is covered by a different tape, the cam 11 may be ground with precision and the grinding wheel 15 need not be replaced although its grinding surface 18 wears with use. The actual grinding of the cam 11 by the grinding wheel 15 is thus automatically controlled by the programmed data of $\phi$ and Z recorded on the tapes.

FIG. 4 is a block diagram of the automatically controlled cam grinding system of the present invention and FIG. 5 is the automatically controlled cam grinding system of the present invention as utilized for grinding a cam. An operation control 31 functions to provide first control signals and second control signals in accordance with a predetermined program of operations. The operation control 31 may comprise, for example, a program record medium 32 having a program of instructions recorded thereon, a computer 33 to which the record medium 32 is fed and which computes the distance Z in mm. between the axes 13 and 16 of the cam 11 and the grinding wheel 15 for a plurality of actual angles of rotation $\phi$ in degrees of said cam in the aforedescribed manner.

The computer 33 produces a record of control signals on a control record medium 34. The control signals recorded on the record medium 34 include first control signals which correspond to the actual angle $\phi$ of rotation of the cam 11 about its axis 13 and second control signals which correspond to the distance between the axis 16 of the grinding wheel 15 and the axis 13 of the cam 11 for each actual angle of rotation of said cam. The control record medium 34 is fed to a control unit 35 which reads out the first and second control signals from said control record medium, suitably amplifies such control signals and distributes said control signals to the appropriate components of the operating apparatus in accordance with the program of operations recorded on the program record medium 32.

The operating apparatus is mounted on a suitable base 36. A grinder support 37 supports the grinding wheel 15 for rotation about its axis and for linear movement. The grinding wheel 15 is continuously rotated about its axis by a grinder motor 38, by any suitable arrangement which either permits said motor to move linearly in the direction of the arrows 39 with said grinding wheel or permits said grinding wheel to move linearly in the direction of the arrows 39 without disengaging from said motor. The grinding wheel 15 is moved linearly in either direction of the arrows 39 by a grinder control motor 41. The grinder control motor 41 is coupled to and rotates a threaded member 42 of the grinder support 37. The threaded member 42 is coupled at the end opposite its driven end to the shaft 43 of the grinding wheel 15 in a manner whereby clockwise rotation of said threaded member moves said grinding wheel in one of the directions of the arrows 39 and counterclockwise rotation of said threaded member moves said grinding wheel in the opposite direction of said arrows.

A truing device 44 is supported for linear movement in either direction of the arrows 39 by a truing device support 45. A truing control motor 46 is coupled to and rotates a threaded member 47 of the truing device support 45. The threaded member 47 is coupled at the end opposite its driven end to the truing device 44 in a manner whereby clockwise rotation of said threaded member moves said truing device in one of the directions of the arrows 39 and counterclockwise rotation of said threaded member moves said grinding wheel in the opposite direction of said arrows. The truing device 44, when moved into contact with the grinding surface 18 of the grinding wheel 15, smooths, evens, planes or trues said grinding surface. During operation of the apparatus, the grinding surface 18 of the grinding wheel 15 is trued by the truing device 44 at determined times to avoid inaccuracies which would result from the wearing of said grinding surface due to the grinding operation. The grinding surface 18 may wear unevenly and may even have grooves formed therein as a result of the grinding operation. The truing device 44 may be adjusted to smooth to a predetermined degree upon each rotation of the grinding wheel 15. After each truing operation, the grinding wheel 15 is moved linearly toward the cam 11 by the amount that the radius R of said grinding wheel is shortened by said truing operation.

A cam support 48 supports the cam 11 for rotation about its axis and for linear movement. The cam support 48 includes a shaft 49 on which a cam 11 or a plurality of cams 11 may be supported. The cam or cams 11 are rotated with the shaft 49 and are therefore rotated by a cam motor 51 which is supported by the cam support 48. The cam support 48 is mounted on the base 36 for linear movement in either direction of the arrows 52. The cam support 48 is thus movable in the directions of the arrows 52 under the manual control of the operator of the apparatus. A manually operated wheel 53 coupled to the cam support 48 controls the linear movement thereof in either direction of the arrows 52 and a manually operated wheel 54 permits the insertion and removal of the shaft 49.

The control unit 35 of the operation control 31 supplies first control signals corresponding to the actual angle of rotation $\phi$ of the cam 11 to the cam motor 51 via a lead 55. The control unit 35 supplies second control signals corresponding to the distance Z between the axis 16 of the grinding wheel 15 and the axis 13 of the cam 11 to the grinder control motor 41 via a lead 56. The grinding wheel 15 is continuously rotated by the grinder motor 38 which is energized from either the control unit 35 via a lead 57, or an independent source of electrical energy. The truing control motor 46 is energized from the control unit 35 via a lead 58.

Each of the components 32 to 51 of the automatically controlled cam grinding system of the present invention may comprise any suitable known arrangement for performing the operations ascribed thereto.

In operation, the operation control 31 functions in the hereinbefore described manner to provide first control signals in the lead 55 and to provide second control signals in the lead 57 in accordance with a predetermined program of operations on the program record medium 32. The program record medium 32 preferably comprises a tape on which the intelligence is recorded mechanically by perforations or the like, magnetically, or by any suitable method. The control record medium 34 may also comprise a tape. Preferably, the tape 34 is provided as a plurality of perforated or magnetically recorded tapes, each corresponding to 10 mm. of the radius R of the grinding wheel 15. Thus, each successive 10 mm. of the radius R has its corresponding first and second control signals recorded on a separate tape.

The operation of the truing device 44 via the truing control motor 46 and the truing device support 45 is controlled via the lead 58 by the operation control 31 from the recorded program and the continuous rotation of the grinding wheel 15 via the grinder motor 38 is controlled via the lead 57.

The operator of the apparatus inserts a shaft 49 supporting a cam or cams 11 to be ground on the cam support 48, by operating the wheel 54 or other suitable device, and moves said cam support, by operating the wheel 53 or other suitable device, until the surface to be ground of a cam 11 is in abutting contact with the grinding surface 18 of the grinding wheel 15. The cam 11 is then rotated about its axis to incrementally present to the grinding surface 18 of the grinding wheel 15 the surface to be ground. The rotation of the cam is controlled by the operation control 31 by the first control signals via the lead 55 to provide intermittent energization, actuation or operation of the cam motor 51. The cam motor 51 thus rotates the cam 11 intermittently, to enable the grinding wheel 15 to grind each increment of the surface of said cam to be ground.

The grinder motor 38 is continuously energized, actuated or operated and continuously rotates the grinding wheel 15 about its axis 16. The grinder motor 38 may be energized by the operation control 31 via the lead 57 The operation control 31 controls the energization, actuation or operation of the grinder control motor 41 by the second control signals via the lead 56 to provide intermittent linear movement of the grinding wheel 15 through such movement of the grinder support 37. Thus, as hereinbefore described, for each actual angle of rotation $\phi$ of the cam 11, the grinding wheel 15 is moved closer to or farther from said cam, so that the axes 13 and 16 are maintained at the calculated distance Z from each other at each said actual angle of rotation, and thereby the grinding surface 18 of the cam 15 is maintained in constant contact with the cam surface to be ground.

Under the control of the operation control 31, due to the program of operations recorded on the tape 32 thereof, after each complete revolution of the cam 11, the truing control motor 46 is energized, actuated or operated via the lead 58 to move the truing device support 45 in linear direction toward the grinding surface 18 of the grinding wheel 15 until the truing device 44 contacts said grinding surface and functions to true, smooth, plane or even said grinding surface. After the grinding surface 18 of the grinding wheel 15 is trued to a determined degree or depth, the grinder control motor 41 moves the grinder support 37, and thereby said grinding wheel, closer to the cam 11 by the amount of the difference in the radius R of the grinding wheel 15 before and after truing, under the control of the operation control 31. The apparatus is then in condition for the next grinding operation as soon as the next cam to be ground is moved into contact with the grinding surface of the grinding wheel.

A suitable system which may be incorporated into the control unit 35 of the operation control 31 of the present invention is that disclosed in copending patent application Ser. No. 114,267, filed June 1, 1961 and assigned to the same assignee as the present invention and now abandoned. Since the control instructions for the operation of the truing device 44 are the same for each truing operation, such instructions may be recorded on an endless tape in the operation control 31 to avoid constant repetition of such instructions.

While the invention has been described by means of a specific example and in a specific embodiment, we do not wish to be limited thereto, for obvious modifications will occur to those skilled in the art without departing from the spirit and scope of the invention.

We claim:
1. An automatically controlled cam grinding system for grinding a cam having an axis and a surface to be ground, said cam being adapted to be rotated about its axis through an angle to lift a valve a distance above the axis of said cam, said cam grinding system comprising a grinding wheel having an axis and a grinding surface;
grinder supporting means supporting said grinding wheel for rotation about its axis and for linear movement;
cam supporting means supporting said cam for rotation about its axis and for linear movement;
operation control means for providing control signals including first control signals and second control signals in accordance with a predetermined program of operations;
cam control means connected to said operation control means and coupled to said cam supporting means for rotating said cam in accordance with said first control signals from said operation control means; and
grinder control means connected to said operation control means and coupled to said grinder supporting means for rotating said grinding wheel about its axis and for moving said grinder supporting means and said grinding wheel supported thereby linearly relative to said cam in accordance with said second control signals from said operation control means whereby said cam is shifted in angle of rotation to incrementally present to the grinding surface of said grinding wheel the cam surface to be ground and said grinding wheel is shifted linearly relative to said cam to maintain constant contact between the grinding surface and the surface to be ground, the linear movement of said grinding wheel and the rotation of said cam being in accordance with the relation $$Z = \sqrt{(X+R)^2 + \left(\frac{dX}{d\alpha}\right)^2}$$

and the relation $$\phi = \alpha + \tan^{-1}\left(\frac{\frac{dX}{d\alpha}}{R+X}\right)$$

wherein Z is the distance between the axis of said grinding wheel and the axis of said cam, $\phi$ is the angle of rotation of said cam relative to a line through said axes, $\alpha$ is the angle of rotation of said cam relative to a valve lifted thereby, X is the distance above the axis of the cam a valve is lifted relative to the angle $\alpha$ and R is the radius of said grinding wheel.

2. An automatically controlled cam grinding system as claimed in claim 1, wherein said grinder control means rotates said grinding wheel continuously about its axis.

3. An automatically controlled cam grinding system as claimed in claim 1, wherein said first control signals correspond to the actual angle of rotation of said cam and said second control signals correspond to the distance between the axis of said grinding wheel and the axis of said cam.

4. An automatically controlled cam grinding system as claimed in claim 1, further comprising truing means for the grinding surface of said grinding wheel, truing supporting means supporting said truing means for linear movement and truing control means connected to said operation control means and coupled to said truing supporting means for moving said truing support means and said truing means supported thereby linearly relative to the grinding surface of said grinding wheel in accordance with control signals from said operation control means whereby said truing means abuts said grinding surface to true said grinding surface at determined times.

5. An automatically controlled cam grinding system as claimed in claim 3, further comprising truing means for the grinding surface of said grinding wheel, truing supporting means supporting said truing means for linear movement and truing control means connected to said operation control means and coupled to said truing supporting means for moving said truing supporting means and said truing means supported thereby linearly relative to the grinding surface of said grinding wheel in accordance with control signals from said operation control means whereby said truing means abuts said grinding surface to true said grinding surface at determined times.

6. An automatically controlled cam grinding system as claimed in claim 5, wherein said truing means abuts said grinding surface to true said grinding surface after each grinding operation.

7. An automatically controlled cam grinding system as claimed in claim 5, wheren said operation control means includes a record medium, means for recording said control signals including said first control signals and said second control signals on said record medium in accordance with said predetermined program of operations and control means in operative proximity with said record medium and connected to said cam control means, said grinder control means and said truing control means for reading out and distributing said control signals.

8. An automatically controlled cam grinding system as claimed in claim 7, wherein said record medium comprises tape.

9. An automatically controlled cam grinding system as claimed in claim 7, wherein said record medium comprises a plurality of tapes each corresponding to a determined length of the radius of said grinding wheel.

References Cited

UNITED STATES PATENTS

| | | | |
|---|---|---|---|
| 1,017,879 | 2/1912 | Landis | 51—101 |
| 3,056,240 | 10/1962 | Morgan et al. | 51—165 |
| 3,083,580 | 4/1963 | Carson et al. | 90—13 |
| 3,247,620 | 4/1966 | Happel | 51—105 |
| 3,344,559 | 10/1967 | Inaba et al. | 51—105 |

LESTER M. SWINGLE, Primary Examiner

U.S. Cl. X.R.

51—101, 165